UNITED STATES PATENT OFFICE 2,547,261

PEST COMBATING COMPOSITIONS

Max Geiger and Eduard Usteri, Basel, and Andreas Ruperti, Arlesheim, Switzerland, assignors to Ciba Limited, Basel, Switzerland No Drawing. Application August 13, 1948, Serial No. 44,225. In Switzerland August 15, 1947

4 Claims. (Cl. 167—42)

At the present time the combating of pests, whether of vegetable or animal origin, depends mainly on producing coatings which are poisonous to the pests. These coatings are produced by two different methods, either spraying liquids are used which contain the poisonous substance in dissolved or suspended form or dusting powders are applied which contain the active substance. Naturally it is attempted in these methods to produce coatings which are in as adherent a state as possible in order to enhance their resistance especially towards weather influences. Thus, it has already been proposed to produce coatings with the addition of polyvinyl alcohols, but the adherence of the coatings is not sufficiently enhanced in this manner. In a furthere known method coatings are produced with the addition of hardenable aminoplasts. The initially water-soluble aminoplasts used as adherent agents must become converted into the hardened and washer-insoluble condition after the spraying or dusting operation. For this purpose special substances having a hardening action are necessary, which harden the aminoplasts in the presence of moisture. In this manner the coatings produced become firmly adherent only after a long time. Furthermore, such preparations are sensitive to moisture, so that undesired premature hardening during storage must be avoided; otherwise the preparations become useless.

The present invention is based on the observation that pest-combating preparations, which yield adherent coatings in a short time, can be made by mixing a pest-combating agent in either order of succession with a substance yielding ammonia and with a water-insoluble salt of a metal capable of forming complexes and of a carbohydrate containing carboxyl groups, which salt is capable of forming with the substance yielding ammonia a water-soluble complex compound which, when dried from aqueous solution, splits up into the insoluble salt and ammonia. Instead of using a substance yielding ammonia and the water-insoluble salt, there may be used the reaction product of these two components, that is to say the water-soluble complex compound.

By the expression "carbohydrates containing carboxyl groups" are meant acids which are naturally occurring polymeric carbohydrates or which are prepared from polymeric carbohydrates. For example, there may be mentioned cellulose lactic acid ethers, methyl-cellulose glycollic acid ethers and especially cellulose glycollic acid ethers and starch glycollic acid ethers prepared in the usual manner, and also pectic acids and especially alginic acids.

The water-insoluble salts of the above mentioned polymeric acids, which are capable of forming with substances yielding ammonia water-soluble complex compounds which, when dried from aqueous solution, split up into the insoluble salt and ammonia, may be derived, for example, from zinc, nickel, cadmium, silver or especially copper. The water-insoluble salts may be prepared by precipitating an aqueous solution of the alkali salt with a soluble salt of the metal capable of forming complexes, for example, silver nitrate, nickel nitrate and above all copper sulphate, or by introducing the dry alkali salt into a solution of the metal salt.

As substances yielding ammonia there come into consideration those which are capable of forming the complex compound with the added salt. As such substances there may be used as well as ammonium salts, such as ammonium carbonate, ammonia solution or ammonia itself in gaseous or liquid form. By the term "ammonium carbonate" there is to be understood, besides ammonium carbonate itself, commercial ammonium carbonate, which, as is known, contains ammonium carbamate. It is also possible to use mixtures of an alkali carbonate or alkali bicarbonate with an ammonium salt of a strong acid, for example, a mixture of sodium carbonate or sodium bicarbonate and ammonium chloride. There may also be used, instead of ammonia solutions easily volatile weak bases, for example, alkylamines such as methylamine, dimethylamine, ethylamine or the like.

The action of the mixture of a substance yielding ammonia and the water-insoluble salt of the complex-forming metal with the polymeric acid used, as an adherent agent, arises from the fact that the water-soluble complex compound when dried from aqueous solution splits up into ammonia and the water-insoluble salt with the formation of an adherent film.

The new preparations can be made most simply by mixing and/or grinding the pest-combating substance with the above described adherent agents in any desired order of succession. When an ammonium salt is used as the substance yielding ammonia a dry preparation can be obtained, whereas the use of aqueous solutions of ammonia or aqueous solutions of ammonium salts leads to moist preparations or pastes. The substance yielding ammonia may be kept apart from the other components and only added to the latter shortly before the preparation is to be used. The invention also includes these preparations, which as yet contain no substance yielding ammonia. It is also possible, instead of using the substance yielding ammonia and the metal salt, to use the complex compound.

The quantity of the water-insoluble salt of the polymeric acid contained in the finished preparation may vary within wide limits, for example, from 4 to 20 per cent, calculated on the dry weight of the finished preparation, but generally speaking a quantity of about 5–10 per cent. has been found suitable. A plurality of water-insoluble salts of polymeric acids may be present in the same preparation, for example, a copper starch glycollate and a nickel cellulose lactic acid. The quantity of the substance yielding ammonia obviously depends on the quantity of the water-insoluble salt used. If desired, there may also be added a wetting agent, for example, an alkyl-naphthalene sulphonate, a fatty alcohol sulphonate, a polyethylene glycol derivative of an alkylated phenol or the like, or an inert filling material, carrier or agent for identification purposes such, for example, as kaolin, gypsum, bentonite or kieselguhr, or another addition such, for example, as casein or glue or gelatine powder, sulphite cellulose waste liquor, a cellulose derivative, silica gel, a mineral oil or the like.

While the moist preparations or pastes are exclusively used for making spraying liquids and applied by spraying, the dry preparations may be used either as dry dusting preparations or, after being stirred with water, as spraying liquids. When the preparations are used as dry dusting preparations the substrata to be protected must be in the wet state in order that the formation of the complex compound from the substance yielding ammonia and the salt can take place. For this purpose a heavy dew, a fall of rain or an artificial sprinkling with water suffices. In all cases extraordinarily adherent coatings are produced which are distinguished by an excellent period of activity.

As pest-combating agents there come into consideration either inorganic or organic compounds which have a fungicidal or insecticidal or a fungicidal and insecticidal action, for example, copper oxychloride, copper phosphate, lead arsenate, hexachlorocyclohexane, sulphur, 4:4'-dichlorodiphenyl - trichloromethyl - methane, 3:6-dinitro - monochlorocarbazole, 2:4 - dinitrothiocyanobenzene, tetramethyl-thiuram mono- or disulphide and others, or a mixture of two or more of such compounds.

The adherent agents used in the present invention, as compared with the known use of hardenable aminoplasts, afford various important advantages. Preparations made therewith are stable during storage in packed form, whether in the form of dry powders or in the form of pastes, without the need of observing special precautions either in the manufacture or during the storage of the preparations. If, for example, owing to unsuitable storage conditions a dry powder becomes moist or a paste becomes dry the preparation can be easily regenerated, in the former case by drying it and adding fresh ammonium carbonate, and in the latter case by adding an aqueous solution of ammonia. A further advantage is that, as a rule, a smaller addition of the adherent agent suffices to fix the coating. Finally, the fact that the coatings are firmly adherent immediately after drying is a very important advantage, because the possibility of the coating being washed away, for example, by a downpour of rain, in the interval between the dusting or spraying operation and the drying of the coating, is very slight.

The invention is illustrated in the following examples, in which the parts are by weight, and the methyl-cellulose is a product which is of only limited solubility in water, that is to say it dissolves in cold water but is insoluble in hot water, and of which a solution of 2 grams in 100 grams of water has a viscosity of 2250 centipoises at 20° C:

Example 1

A pest-combating preparation in pulverulent form is prepared by uniformly mixing and finely grinding the following ingredients:

10 parts of 4:4' - dichlorodiphenyl - trichloromethyl-methane,
1 part of ammonium di-isobutyl-napthalene sulphonate,
5 parts of a mixture of 1 part of methyl-cellulose and 4 parts of kaolin,
5 parts of sodium carbonate,
6 parts of ammonium chloride,
5 parts of the copper salt of a cellulose glycollic acid which contains about 0.8 glycollic acid groups per $C_6H_{10}O_5$-unit (prepared from the sodium salt which is an ordinary commercial product, of which a solution of 6.2 grams in 100 grams of water has a viscosity of 2250 centipoises at 20° C., and having a content of about 50 per cent. of the cellulose derivative)
18 parts of talcum and
50 parts of kaolin 100 parts.

A fine powder is obtained.

Example 2

A pest-combating preparation in pulverulent form is prepared by uniformly mixing and very finely grinding the following ingredients:

70 parts of sulphur,
1 part of ammonium di-isobutyl-naphthalene sulphonate,
5 parts of a mixture of 1 part of methyl-cellulose and 4 parts of kaolin,
10 parts of ammonium carbonate,
10 parts of the copper salt of a potato starch glycollic acid which contains about 0.52 glycollic acid groups per $C_6H_{10}O_5$-unit (prepared from the sodium salt containing about 75 per cent. of the starch derivative, and of which a solution of 4 grams in 100 grams of water has a viscosity of 2250 centipoises at 20° C.) and
4 parts of powdered sulphite cellulose waste liquor 100 parts.

Example 3

A pest-combating preparation in pulverulent form is prepared by uniformly mixing and finely grinding the following ingredients:

50 parts of triplumbic arsenate,
10 parts of the zinc salt of an alginic acid which has been prepared from the sodium salt of an ordinary commercial alginic acid (of which a solution of 1.9 grams of the sodium salt in 100 grams of water has a viscosity of 2250 centipoises at 20° C.)

10 parts of powdered sulphite cellulose waste liquor,
5 parts of a mixture of 1 part of methyl-cellulose and 4 parts of kaolin,
2 parts of ammonium di-isobutyl-naphthalene sulphonate, and
13 parts of kaolin 90 parts.

Example 4

A pest-controlling preparation in pulverulent form is prepared by uniformly mixing and finely grinding the following ingredients:

10 parts of a mixture of kaolin and copper oxychloride corresponding to 5 parts of copper,
5 parts of ammonium carbonate,
5 parts of the copper salt of an alginic acid which has been obtained from the sodium salt of the ordinary commercial alginic acid used in Example 3,
2 parts of ammonium di-isobutyl-naphthalene-sulphonate,
5 parts of a mixture of 1 part of methyl-cellulose and 4 parts of kaolin,
28 parts of talcum and
45 parts of kaolin 100 parts.

Example 5

A pest-combating preparation in pulverulent form is prepared by uniformly mixing and finely grinding the following ingredients:

10 parts of 2:4-dinitro-thiocyanobenzene,
60 parts of sulphur,
5 parts of the nickel salt of a potato starch glycollic acid containing about 0.52 glycollic acid groups per $C_6H_{10}O_5$-unit (prepared from the same sodium salt as that used in Example 2)
5 parts of the copper salt of a cellulose lactic acid containing about 0.7 lactic acid groups per $C_6H_{10}O_5$-unit,
10 parts of ammonium carbonate,
5 parts of a mixture of 1 part of methyl-cellulose and 4 parts of kaolin,
1 part of ammonium di-isobutyl-naphthalene sulphonate and
4 parts of kaolin 100 parts.

Example 6

A pest-combating preparation in the form of a paste is prepared by mixing and homogeneously grinding to a paste the following ingredients:

70 parts of sulphur,
10 parts of 4:4' - dichlorodiphenyl - trichloromethylmethane,
5 parts of the copper salt of a methyl-cellulose glycollic acid (prepared from the sodium salt containing about 50 per cent. of the cellulose derivative and about 4.2 per cent. of —$OCH_3$, and of which a solution of 10 grams in 100 grams of water has a viscosity of 2250 centipoises at 20° C.),
1 part of ammonium di-isobutyl-naphthalene sulphonate,
5 parts of an aqueous ammonia solution of 20 per cent. strength,
9 parts of powdered sulphite cellulose waste liquor, and
200 parts of water 300 parts.

Example 7

Vines wet with dew are dusted with a powder obtainable as described in Example 1. A coating is produced thereon which is stable towards weather influences and protects the plants against the attack of the larvae of *Polychrosis botrana* and *Clysia ambiguella*.

Example 8

2 parts of the powder prepared as described in Example 2 are stirred in 20 parts of water. When the evolution of carbon dioxide has ceased, the whole is diluted with water to 100 parts. Fruit trees are sprayed with the resulting spraying liquid of 2 per cent. concentration, and the trees are remarkably well protected against mildew proper.

Example 9

In order to give fruit trees long-lasting protection against feeding insects, the trees are treated with a spraying liquid of ½ per cent. concentration prepared as follows: 4.5 parts of the mixture made as described in Example 3 are introduced, while stirring powerfully, into 50 parts of water which contains 0.5 part of ammonia solution of 20 per cent. strength. After a short time the whole is diluted with water to 1000 parts.

Example 10

A powder obtainable as described in Example 4 is an excellent dusting powder. When potato plants are dusted with it they acquire a protection, which is resistant to rain, and against dry rot.

Example 11

The dry powder prepared as described in Example 5 can be used directly as a dusting powder, or it can be used to make up a spraying liquid as described in Example 8. Tomato crops treated with either of these preparations acquire a coating which is resistant to weather influences and affords protection against mould diseases.

Example 12

30 parts of the paste obtainable as described in Example 6 are diluted with water to 1000 parts. Fruit trees are sprayed with the resulting spraying liquid, and in this way acquire a protection, which is resistant to rain, against mildew proper and also against insects.

What is claimed is:

1. A dry pest-combating composition comprising as essential ingredients (1) a pest-combating agent, (2) a water-insoluble salt of (a) a metal selected from the group consisting of copper, zinc, nickel, cadmium and silver, and (b) a carbohydrate, containing carboxyl groups, selected from the group consisting of cellulose glycollic acid ethers, starch glycollic acid ethers and alginic acid, and (3) an ammonia-yielding substance selected from the group consisting of an ammonium carbonate and a mixture of equivalent proportions of an ammonium salt of a strong acid and an alkali salt of carbonic acid, the said water-insoluble salt (2) and the said ammonia-yielding substance (3) forming, in presence of water, a water-soluble complex compound which when applied to a substratum yields an adherent film, and when dried splits up into ammonia and the water-insoluble salt.

2. A dry pest-combating composition comprising as essential ingredients (1) a pest-combating agent, (2) a water-insoluble copper salt of a cellulose glycollic acid ether, and (3) a mixture of equivalent proportions of ammonium chloride and sodium carbonate, the said water-insoluble copper salt (2) and the said mixture (3) forming, in the presence of water, a water-soluble complex compound which when applied to a substratum yields an adherent film and when dried splits up into ammonia and the water-insoluble copper salt.

3. A dry pest-combating composition comprising as essential ingredients (1) a pest-combating agent, (2) a water-insoluble copper salt of a starch glycollic acid ether, and (3) a mixture of equivalent proportions of ammonium chloride and sodium carbonate, the said water-insoluble copper salt (2) and the said mixture (3) forming, in the presence of water, a water-soluble complex compound which when applied to a substratum yields an adherent film and when dried splits up into ammonia and the water-insoluble copper salt.

4. A dry pest-combating composition comprising as essential ingredients (1) a pest-combating agent, (2) a water-insoluble copper salt of an alginic acid, and (3) a mixture of equivalent proportions of ammonium chloride and sodium carbonate, the said water-insoluble copper salt (2) and the said mixture (3) forming, in the presence of water, a water-soluble complex compound which when applied to a substratum yields an adherent film and when dried splits up into ammonia and the water-insoluble copper salt.

MAX GEIGER.
EDUARD USTERI.
ANDREAS RUPERTI.

REFERENCES CITED

The following references are of record in the file of this patent:

UNITED STATES PATENTS

| Number | Name | Date |
|---|---|---|
| 1,510,358 | Vandevoorde | Sept. 30, 1924 |
| 1,616,323 | Lieske et al. | Feb. 1, 1927 |
| 2,216,045 | Powers et al. | Sept. 24, 1940 |
| 2,236,545 | Maxwell et al. | Apr. 1, 1941 |
| 2,441,729 | Steiner | May 18, 1948 |